(12) United States Patent
Kyogoku

(10) Patent No.: US 8,743,273 B2
(45) Date of Patent: Jun. 3, 2014

(54) IMAGING DEVICE AND SOLID-STATE IMAGING DEVICE

(75) Inventor: Masanori Kyogoku, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/592,044

(22) Filed: Aug. 22, 2012

(65) Prior Publication Data

US 2012/0314111 A1    Dec. 13, 2012

Related U.S. Application Data

(63) Continuation of application No. PCT/JP2010/005372, filed on Sep. 1, 2010.

(30) Foreign Application Priority Data

Feb. 26, 2010    (JP) .................................. 2010-043290

(51) Int. Cl.
| | |
|---|---|
| G03B 7/00 | (2006.01) |
| H04N 5/235 | (2006.01) |
| H04N 3/14 | (2006.01) |
| H04N 5/335 | (2011.01) |
| G03B 9/70 | (2006.01) |
| G03B 15/03 | (2006.01) |
| G03B 15/02 | (2006.01) |

(52) U.S. Cl.
USPC ........... 348/362; 348/294; 396/166; 396/194; 396/180

(58) Field of Classification Search
USPC .......... 348/294–324, 335–369; 396/166–170, 396/180–195, 235
See application file for complete search history.

(56) References Cited

U.S. PATENT DOCUMENTS

| | | | | |
|---|---|---|---|---|
| 6,542,194 | B1 * | 4/2003 | Juen | 348/367 |
| 6,809,766 | B1 * | 10/2004 | Krymski et al. | 348/296 |
| 6,963,371 | B2 * | 11/2005 | Sakurai et al. | 348/301 |
| 7,355,645 | B2 * | 4/2008 | Sakurai et al. | 348/308 |
| 7,630,009 | B2 * | 12/2009 | Arishima et al. | 348/296 |
| 7,760,265 | B2 * | 7/2010 | You et al. | 348/363 |
| 8,159,578 | B2 * | 4/2012 | Arishima et al. | 348/296 |
| 2004/0081446 | A1 * | 4/2004 | Compton | 396/362 |

(Continued)

FOREIGN PATENT DOCUMENTS

| | | |
|---|---|---|
| JP | 3988215 B2 | 7/2007 |
| JP | 2008-312170 | 12/2008 |
| JP | 2010-011392 A | 1/2010 |

OTHER PUBLICATIONS

International Search Report mailed Sep. 28, 2010 issued in corresponding International Application No. PCT/JP2010/005372.

Primary Examiner — Chia-Wei A Chen
(74) Attorney, Agent, or Firm — McDermott Will & Emery LLP

(57) ABSTRACT

A row scanning unit activates a synchronous curtain shutter mode in which pixel reset scan is performed and exposure of the imaging area is started by the pixel reset scan and is ended by light shielding by a mechanical curtain shutter, the pixel reset scan meaning that scan on a row-by-row basis is performed on pixel reset in which the photodiodes are reset by turning on the transfer transistors and a corresponding reset transistor, wherein in the mechanical curtain synchronous shutter mode, the pixel reset scan according to the traveling characteristics of the mechanical curtain shutter is performed, and the pixel reset scan includes performing a pixel reset operation simultaneously on the unit cells of different rows.

6 Claims, 13 Drawing Sheets

(56) References Cited

U.S. PATENT DOCUMENTS

| | | | |
|---|---|---|---|
| 2005/0105836 A1* | 5/2005 | Gomi et al. | 384/302 |
| 2005/0128324 A1* | 6/2005 | Kishi et al. | 348/294 |
| 2006/0157760 A1* | 7/2006 | Hayashi et al. | 257/293 |
| 2006/0238632 A1* | 10/2006 | Shah | 348/296 |
| 2007/0229687 A1* | 10/2007 | Hiyama et al. | 348/294 |
| 2008/0012976 A1* | 1/2008 | Sakurai et al. | 348/301 |
| 2008/0309806 A1 | 12/2008 | Arishima et al. | |
| 2009/0268083 A1 | 10/2009 | Arishima et al. | |
| 2010/0201861 A1* | 8/2010 | Kameda et al. | 348/311 |
| 2010/0259659 A1* | 10/2010 | Suzuki | 348/296 |

* cited by examiner

FIG. 8B

Setting example of reset scan register

| Register | Set value |
|---|---|
| Simultaneous reset row number change point 1 | 2 |
| Simultaneous reset row number change point 2 | 10 |
| Simultaneous reset row number change point 3 | 20 |
| ... | ... |
| Simultaneous pixel reset row number 1 | 1 |
| Simultaneous pixel reset row number 2 | 2 |
| Simultaneous pixel reset row number 3 | 5 |

| Register | Set value |
|---|---|
| Pulse width setting change point 1 | 6 |
| Pulse width setting change point 2 | 10 |
| Pulse width setting change point 3 | 20 |
| ... | ... |
| Pulse width setting 1 | 10 |
| Pulse width setting 2 | 15 |
| Pulse width setting 3 | 20 |

IMAGING DEVICE AND SOLID-STATE IMAGING DEVICE

CROSS REFERENCE TO RELATED APPLICATIONS

This is a continuation application of PCT Patent Application No. PCT/JP2010/005372 filed on Sep. 1, 2010, designating the United States of America, which is based on and claims priority of Japanese Patent Application No. 2010-043290 filed on Feb. 26, 2010. The entire disclosures of the above-identified applications, including the specifications, drawings and claims are incorporated herein by reference in their entirety.

FIELD

The present invention relates to a Metal Oxide Semiconductor (MOS)-type solid-state imaging device or an imaging device using the MOS-type solid-state imaging device, and especially relates to a technique suitable for a digital single-lens reflex camera as an imaging device.

BACKGROUND

Recently, a technique for digital still cameras using the MOS-type solid-state imaging devices has been growing rapidly. Moreover, a curtain shutter is one of the features of a single-lens reflex camera, and a focal-plane shutter is widely used for the single-lens reflex camera. However, the focal-plane shutter is required to include mechanical shutters both for a front curtain which determines the start of exposure and a rear curtain which determines the end of exposure, which results in an increase in the size and weight of a camera.

Meanwhile, the conventional technique of Patent Literature 1 discloses a technique for dispensing with a front curtain shutter which determines the timing of start of exposure and including an electronic front curtain shutter function as an alternative to a front curtain shutter which determines the timing of the start of exposure for the solid-state imaging device, by pixel reset scan timing for the solid-state imaging device itself.

CITATION LIST

Patent Literature

[PTL1.] Japanese Unexamined Patent Application Publication No. 2008-312170

SUMMARY

Technical Problem

The conventional technique disclosed in Patent Literature 1 realizes an electronic front curtain shutter which is suited to a traveling time of a mechanical rear curtain shutter by sequentially performing a pixel reset scan of the next row of pixels while resetting a row of pixels for a pixel reset scan for the solid-state imaging device.

However, as shown in FIG. 11, in Patent Literature 1, while a pixel reset on the Nth row is being performed, a pixel reset start is performed for (N+1)th row and the following rows and a pixel reset end is performed for (N−1)th and the previous rows, and therefore coupling noise caused by rising and falling of pixel reset signals of the neighboring rows such as (N+1)th and (N−1)th occurs to a pixel reset signal of the Nth row. Furthermore, since the traveling characteristics of the rear curtain shutter are non-linear, the amount of noise is different for each of the rows, with a result that image quality is degraded.

Moreover, a unit cell structure for sharing of a pixel reset transistor and a floating diffusion unit by a plurality of photodiodes and transfer transistors (hereafter, a structure for being sharing by n photodiodes is referred to as an n-pixel one-cell structure) is considered for restricting a decrease in sensitivity along with miniaturization of a pixel size. In this case, since a condition gap occurs to each of the rows due to the sharing of a reset transistor and a floating diffusion unit in the neighboring pixel rows, image quality is sometimes degraded.

For example, in the two-pixel one-cell structure that shares a reset transistor and a floating diffusion unit by two photodiodes and two transfer transistors, when a reset in the Nth row is completed, a pixel reset is completed while the two transfer transistors are turned on. Meanwhile, when the reset of (N+1)th row is completed, a pixel reset is completed while only one transfer transistor is turned on. Therefore, there is a gap in reset state between the Nth row and the (N+1)th row, and image quality is degraded.

The present invention has an object to provide a solid-state imaging device and an imaging device which have a multiple-pixel one-cell structure that reduces image quality degradation in a mechanical curtain synchronous shutter mode.

Solution to Problem

The solid-state imaging device to attain the above mentioned goal includes: an imaging area in which a plurality of unit cells are arranged in rows and columns; and a row scanning unit configured to perform pixel reset scan and pixel readout scan in the imaging area on a row-by-row basis, wherein each of the unit cells includes: two or more photodiodes each of which converts incident light into electric charges; a floating diffusion unit configured to hold the electric charges; a transfer transistor which is provided in correspondence with the two or more photodiodes and transfers the electric charges from the photodiodes to the floating diffusion unit; and a reset transistor which resets electric potential of the floating diffusion unit, wherein, in each of the unit cells, the two or more photodiodes share the reset transistor and the floating diffusion unit, the row scanning unit is configured to activate a mechanical curtain synchronous shutter mode in which pixel reset scan is performed and exposure of the imaging area is started by the pixel reset scan and is ended by light shielding by a mechanical curtain shutter, the pixel reset scan meaning that scan on a row-by-row basis is performed on pixel reset in which the photodiodes are reset by turning on the transfer transistor and a corresponding reset transistor, in the mechanical curtain synchronous shutter mode, the pixel reset scan is performed according to traveling characteristics of the mechanical curtain shutter, and the pixel reset scan includes performing a pixel reset operation simultaneously on the unit cells of different rows.

With this configuration, since a pixel reset is simultaneously performed on unit cells of different rows, it is possible to prevent coupling noise in a lifetime of a reset pulse. In other words, variation in the reset level by coupling is prevented and image quality degradation can be reduced.

Here, in the mechanical curtain synchronous shutter mode, the row scanning unit may be configured to: avoid simultaneously turning on the transfer transistor and another transfer transistor included in the unit cell; and simultaneously turn on transfer transistors in unit cells of different rows.

With this configuration, it is possible to sufficiently reset each of the photodiodes in a unit cell, to prevent an afterimage caused by the existence of electric charges that are not reset, and to reduce degradation in image quality.

Here, the solid-state imaging device may further include a first register group which holds a number of rows in which the pixel reset is to be simultaneously performed and a row address in which the number of rows is changed, wherein in the mechanical curtain synchronous shutter mode, the row scanning unit may be configured to perform the pixel reset scan according to the number of rows and the row address that are written into the first register group.

With this configuration, even in the case where the traveling characteristics of the mechanical curtain shutter are non-linear and kinds of the mechanical curtain shutters are different, it is possible to finely match the number of rows that are simultaneously reset in the pixel reset scan and the row in which a reset timing is changed.

Here, the solid-state imaging device may further include a second register group which holds a pulse width with which the pixel reset is performed and a row address in which the pulse width is changed, wherein in the mechanical curtain synchronous shutter mode, the row scanning unit may be configured to perform the pixel reset scan according to the pulse width and the row address that are written into the second register group.

With this configuration, in the case where the traveling characteristics of the mechanical curtain shutter are non-linear and kinds of the mechanical curtain shutters are mutually different, it is possible to finely match the pulse width and the changed row in the pixel reset scan. Moreover, it is possible to avoid generating a gap in the reset state between photodiodes in a unit cell, and to reduce degradation in image quality.

Here, in the mechanical curtain synchronous shutter mode, the row scanning unit may be configured to perform the pixel reset scan such that in a simultaneous pixel reset operation on unit cells of different rows, rising timing and falling timing of a reset pulse signal to the unit cells of the different rows match and rising timing and falling timing of a transfer pulse signal to the unit cells of the different rows match.

With this configuration, coupling noise caused by an overlap of (i) the reset period for the Nth row (when the reset signal is asserted) and (ii) rising and falling of reset signals in a plurality of rows that are neighboring back and forth can be prevented. In other words, variation in the reset level by coupling can be prevented and image quality degradation can be reduced.

Moreover, the imaging device that achieves the above mentioned goal includes a mechanical curtain shutter and the above described solid-state imaging device.

Advantageous Effects

The present invention can contribute to reducing coupling noise in the lifetime of a reset pulse. In other words, variation in the reset level by coupling can be prevented and image quality degradation can be reduced.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENT

The solid-state imaging device according to the present embodiment includes an imaging area in which a plurality of unit pixels are arranged in rows and columns, and a row scanning unit which performs pixel reset scan and pixel readout scan in the imaging area by a row-by-row basis. The unit cell includes: two or more photodiodes each of which converts incident light into electric charges; a floating diffusion unit which holds electric charges; two or more transfer transistors each of which is provided in correspondence with the two or more photodiodes and transfers the electric charges from a corresponding one of the photodiodes to the floating diffusion unit; and a reset transistor which resets the electric potential of the floating diffusion unit. In one unit cell, the two or more photodiodes and the two or more transfer transistors share the reset transistor and the floating diffusion unit. The row scanning unit performs pixel reset scan. Here, the pixel reset scan means that scan on a row-by-row basis is performed on pixel reset in which the photodiodes are reset by turning on the transfer transistors and the corresponding reset transistor. A synchronous curtain shutter mode is activated in which exposure of the imaging area is started by the pixel reset scan and the exposure of the imaging area is ended by light shielding by the mechanical curtain shutter. In the mechanical curtain synchronous shutter mode, the pixel reset scan is performed corresponding to the traveling characteristics of the mechanical curtain shutter, and the pixel reset scan is configured to include a pixel reset operation performed simultaneously on unit cells of different rows.

With this configuration, since a pixel reset is simultaneously performed on unit cells of different rows, it is possible to prevent coupling noise in a lifetime of a reset pulse. In other words, variation in the reset level by coupling can be prevented and image quality degradation can be reduced.

Hereafter, the imaging device and the solid-state imaging device according to the embodiment of the present invention will be described with reference to the drawings.

Figure 1:
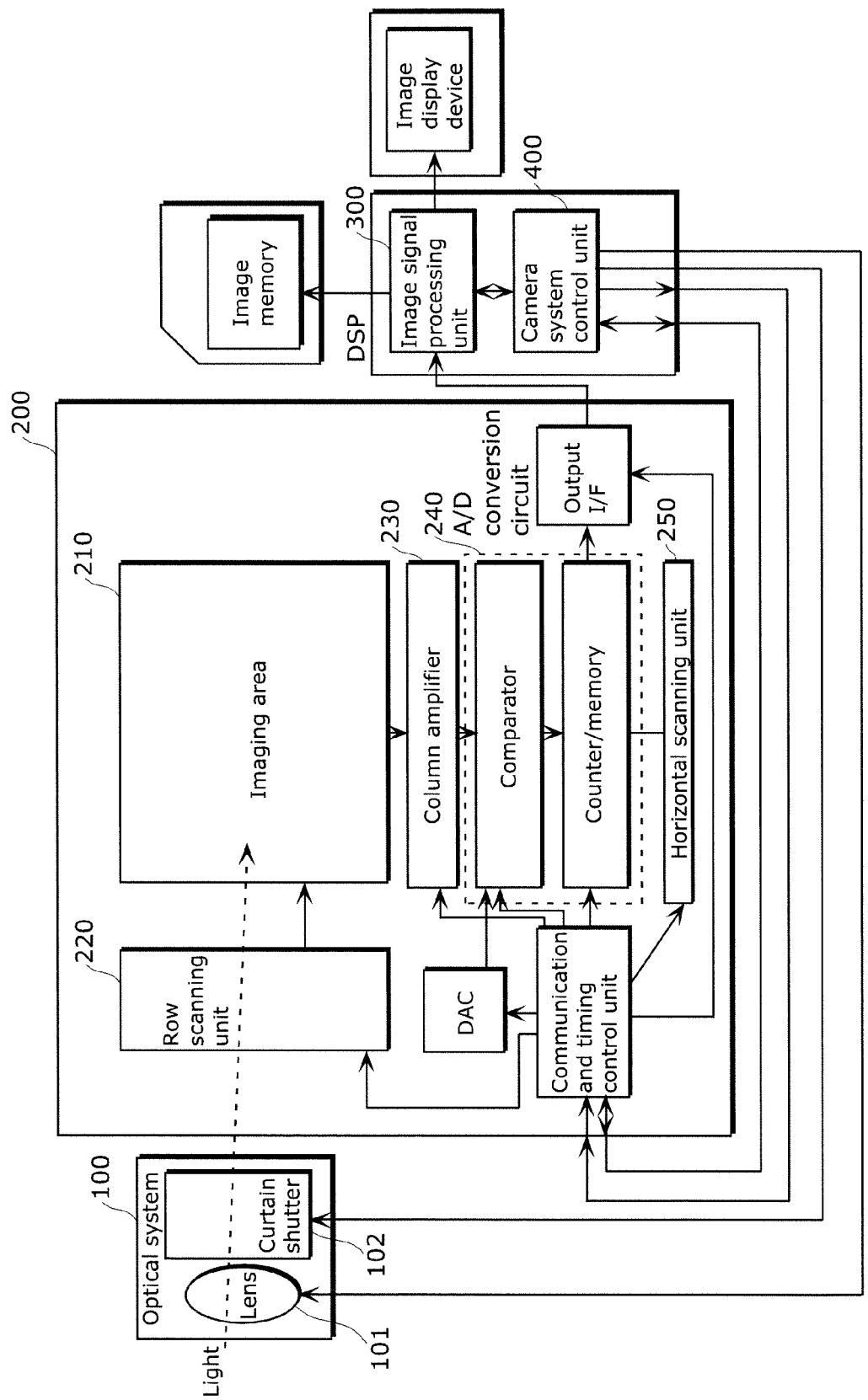
FIG. 1 is a diagram showing an example of a system configuration of an imaging device according to an embodiment of the present invention.

FIG. 1 shows a configuration of an imaging device (a camera) according to the embodiment of the present invention.

The imaging device according to the present invention, as shown in FIG. 1, generally includes an optical system 100, a solid-state imaging device 200, an image signal processing unit 300, and a camera system control unit 400.

The optical system 100 includes a lens 101 which forms an image on the imaging area of the solid-state imaging device 200 by focusing light from a subject, and a mechanical shutter 102 (hereafter referred to as a curtain shutter) which is located on a light path between the lens 101 and the solid-state imaging device 200 and controls an amount of light that is led to the imaging area.

The solid-state imaging device 200 includes: an imaging area 210 including a pixel arrangement in which unit pixels each including a light-sensitive element such as a photodiode and a MOS transistor are arranged in a two-dimensional array; a row scanning unit 220 which selects pixels in the imaging area 210 on a row-by-row basis and controls reset and readout of pixels; a column amplifier 230 which amplifies the pixel signal read out from the imaging area 210; an analog-to-digital (A/D) conversion circuit 240 which performs an A/D conversion on the pixel signal amplified by the column amplifier 230; and a horizontal scanning unit 250 which activates the readout of the digital pixel signals which are held by selecting each of the columns of counter/memory of the A/D conversion circuit 240. It should be noted that the row scanning unit 220 is also called a vertical scan control unit, but is referred to as the row scanning unit.

The image signal processing unit 300 is a Digital Signal Processor (DSP) or the like which performs, upon receipt of digital pixel signals output from the solid-state imaging device 200, gamma correction, color interpolation, spatial interpolation, and automatic white balance that are necessary for camera signal processing. Moreover, there are also cases where conversion into a compression format such as Joint Photographic Experts Group (JPEG) and recording on a memory, or display signal processing for a liquid crystal display included on a camera are performed.

The camera system control unit 400 is a microcomputer or the like which integrates the whole operations of the imaging device by controlling the optical system, the solid-state imaging device, and the image signal processing unit according to settings specified by user I/F (not illustrated). The user I/F, for example, receives, as an input, also real-time instructions such as a change in zoom factor and a release button and the like, and controls a change in zoom factor of the lens 101, a travel of the curtain shutter 102, and a reset scan of the solid-state imaging device 200. Especially from a viewpoint of the present invention, it is assumed that a designer of a camera system writes, into the reset scan register to be described later via the user I/F, a control parameter according to the reset scan which is suited to the traveling characteristics of the curtain shutter.

Figure 9:
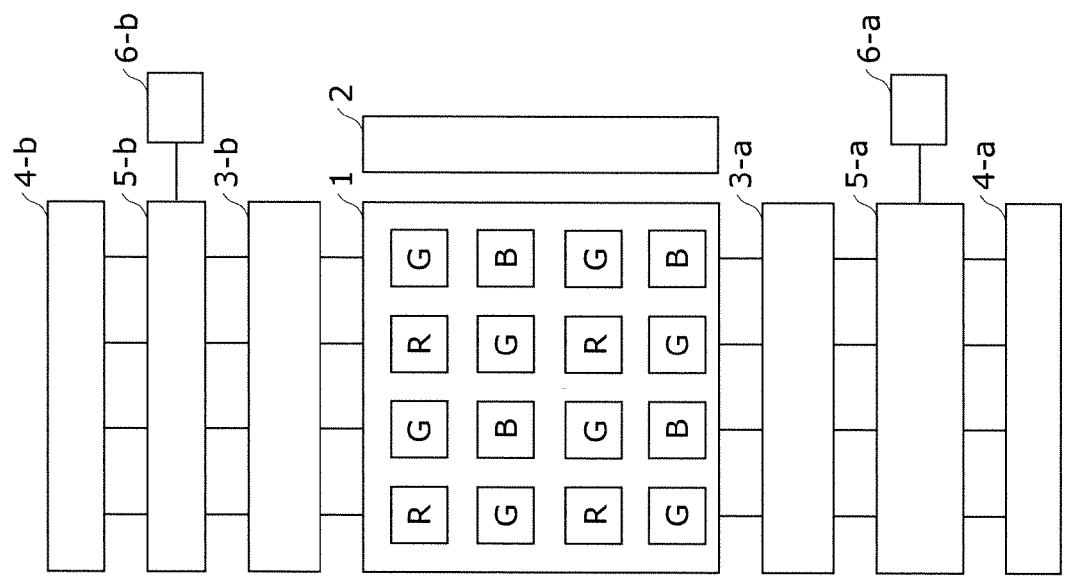
FIG. 9 is a diagram showing an example of a configuration of the solid-state imaging device according to the embodiment of the present invention.

It should be noted that the solid-state imaging device according to the present embodiment, as shown in FIG. 9, includes an imaging unit 1, a row selection encoder 2, two signal processing units 3-a and 3-b, two column selection encoders 4-a and 4-b, two horizontal signal lines 5-a and 5-b, two output circuits 6-a and 6-b, and can use a configuration for outputting from a plurality of directions of column signals (for example two directions).

Furthermore, the solid-state imaging device can use a configuration in which pixels are formed on the surface of a semiconductor substrate, that is, the same plane as that on which wiring and gate terminal of a transistor are formed, and a configuration of a so-called back-illuminated type image sensor (back-illuminated type solid-state imaging device) in which pixels are formed on the back side of a semiconductor substrate, that is, the back side with respect to the plane on which wiring and gate terminal of a transistor are formed.

Figure 2A:
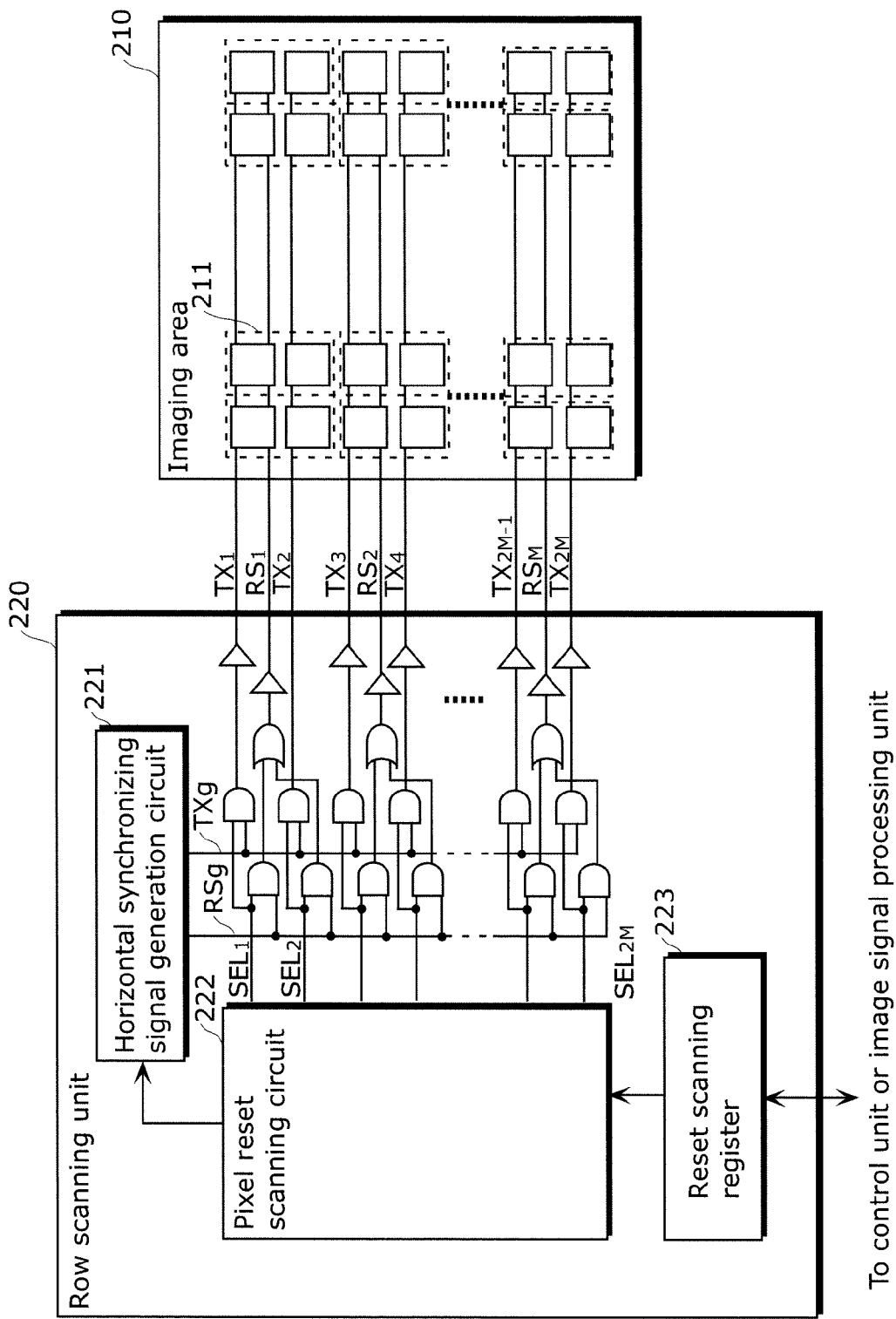
FIG. 2A is a diagram showing an example of a detailed configuration of a row scanning unit and an arrangement of pixels in the solid-state imaging device according to the embodiment of the present invention.
Figure 2B:
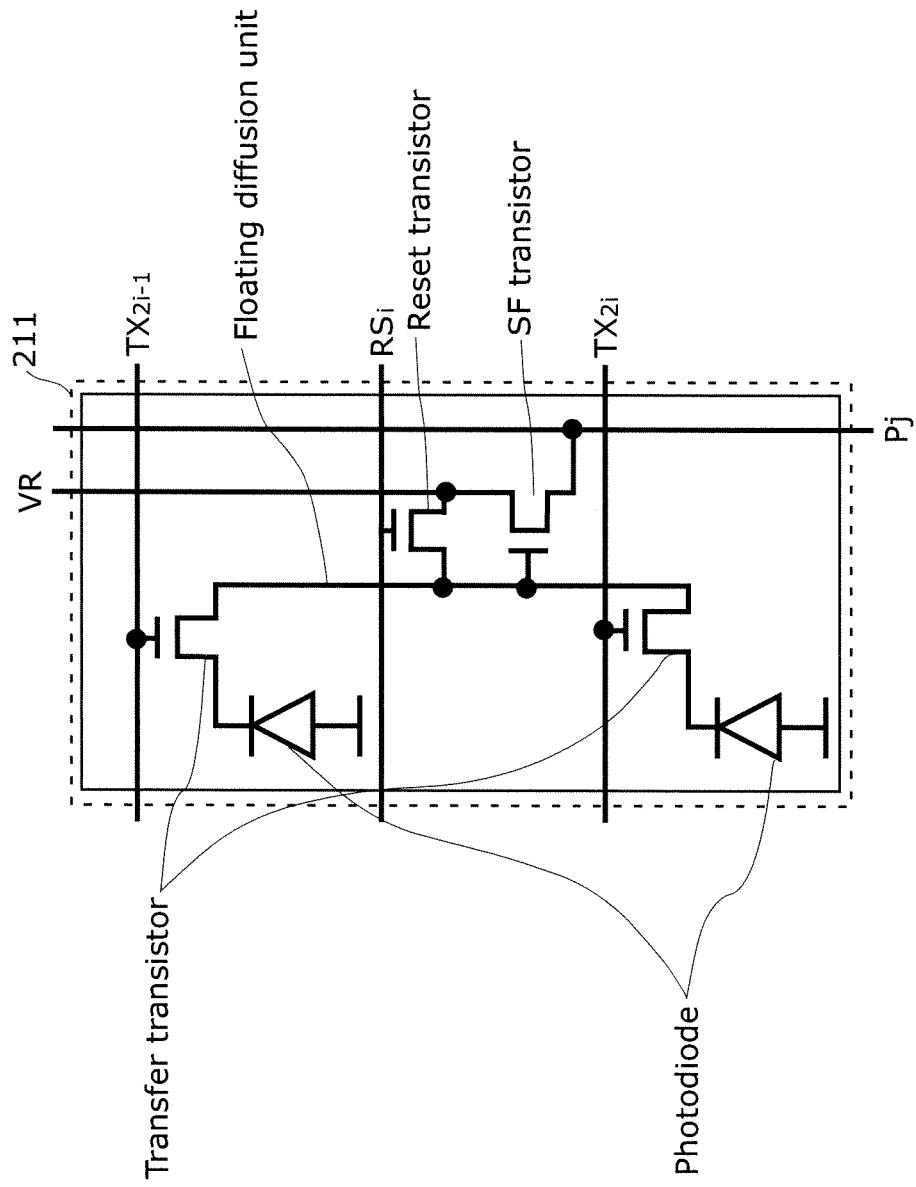
FIG. 2B is a diagram showing an example of a detailed configuration of a unit cell in the solid-state imaging device according to the embodiment of the present invention.

Next, FIG. 2A is a diagram showing an example of a detailed configuration of a solid-state imaging device according to the embodiment of the present invention. FIG. 2B is a diagram showing an example of a detailed configuration of a unit cell in the imaging device according to the embodiment of the present invention. More specifically, the connection of the imaging area 210 with components involved in reset scan by the row scanning unit 220 will be described. It should be noted that the illustration is omitted for a pixel readout scanning circuit included in the row scanning unit 220 and a circuit which is connected to the pixel readout scanning circuit and only reads out pixels.

As shown in FIG. 2A, the imaging area 210 is composed by arranging unit cells 211 (imaging area). As shown in FIG. 2B, the unit cell 211 includes two photodiodes, a floating diffusion unit with respect to two transfer transistors, a reset transistor (shared reset transistor), and a source-follower (SF) transistor (shared SF transistor). The configuration is a so-called multiple-pixel one-cell (two-pixel one-cell) structure in which each of the signals of the two photodiodes passes a corresponding one of the transfer transistors and is read out by the floating diffusion unit.

The row scanning unit 220 includes: a horizontal synchronizing signal generation circuit 221 which generates RSg signal and TXg signal which are original signals common to each of the rows of RSi signal controlling On/Off of the pixel reset transistor and $TX_i$ signal controlling On/Off of the pixel transfer transistor, respectively; a pixel reset scanning circuit 222 which performs a selection scanning for pixel reset for each of the rows in the imaging area 210; and a reset scanning register 223 which specifies a control parameter of the pixel reset scanning circuit. The RSg signal and the TXg signal are provided to the imaging area 210 as $TX_i$ signal and $RS_i$ signal which take logic with $SEL_i$ via a logical circuit included in the row scanning unit 220.

It should be noted that the unit cell according to the embodiment of the present invention will be described with a two-pixel one-cell structure. In the case where the unit cell has a four-pixel one-cell structure or a plurality of photodiodes are shared, the same effects can be generated. Therefore, the structure of the unit cell is not especially needed to be limited. In other words, the readout unit is shared by two pixels in the above, but it is possible for more pixels such as three pixels or four pixels to share the readout unit. Furthermore, the pixels sharing the readout unit may straddle among a plurality of rows.

Next, with reference to FIG. 3, a pixel reset timing in which a curtain shutter is not used will be described.

The original signals RSg and TXg output from the horizontal synchronizing signal generation circuit 221 are signals which become active once in a horizontal scanning period determined by an HD synchronous pulse that is input externally in the case where the curtain shutter is not used. The row selection signal $SEL_i$ which sequentially outputs SEL1, SEL2, . . . from the pixel reset scanning circuit is basically a signal which becomes active in a horizontal scanning period. $SEL_i$ takes logical AND with the above described RSg and TXg, and RSg further takes logical OR with the signal which has taken logical AND, and is sequentially output as RS, and TX, via a buffer for waveform shaping (or level shifter for signal amplitude transform). The validity of reset with respect to a pixel is realized by controlling such that both $RS_i$ and $TX_i$ have an "H" period, or by generating a pulse in an order from $TX_i$ to $RS_i$.

Here, as described with reference to FIG. 3, a mode in which a pixel reset scan is performed on only a row of pixels in a horizontal scanning period is called "native mode" in the description. Meanwhile, a mode in which a pixel reset scan is performed in synchronization with a scanning timing of a curtain shutter due to the use of the curtain shutter is called a "synchronous curtain shutter mode".

Next, with reference to FIG. 4, a reset scanning timing in the synchronous curtain shutter mode will be described.

Figure 4:
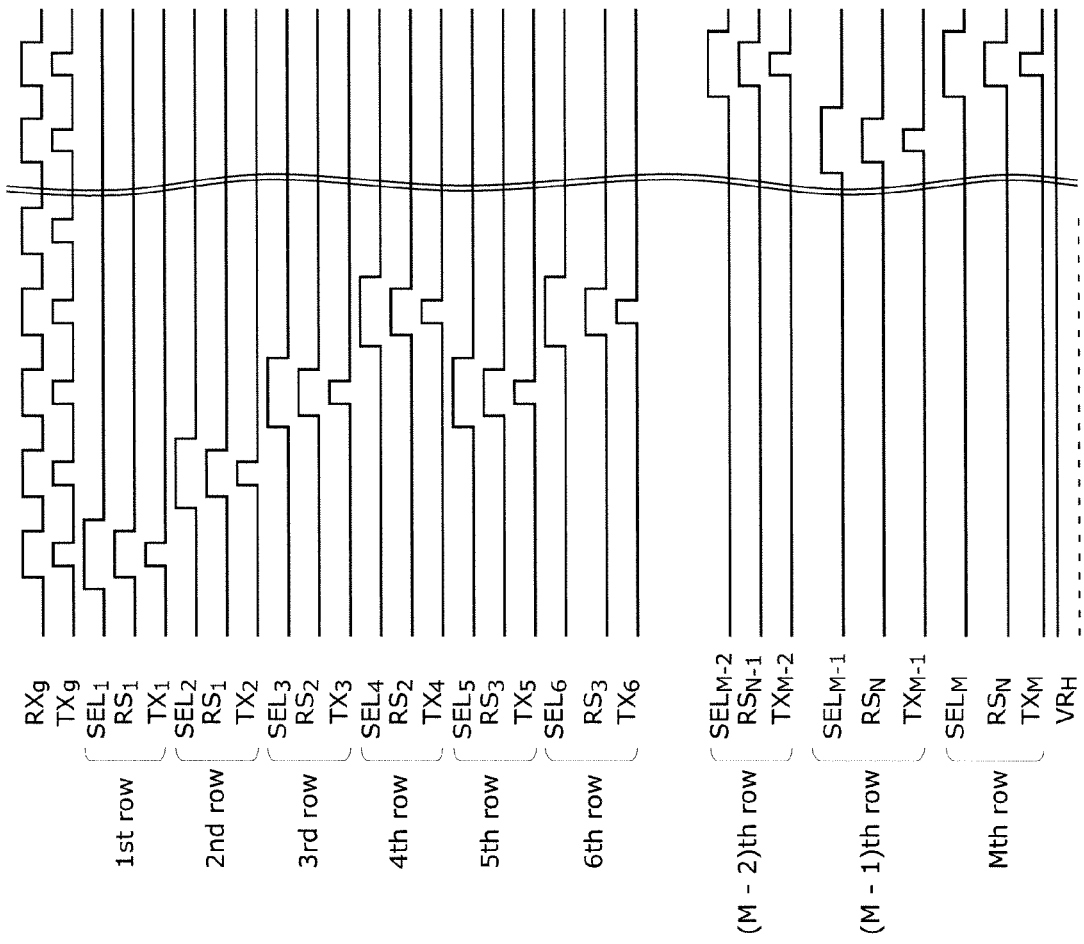
FIG. 4 is a diagram showing a pixel reset scan timing in a curtain synchronous shutter mode according to the embodiment of the present invention.

As shown in FIG. 4, the original signals RSg and TXg output from the pulse generation circuit, in the synchronous curtain shutter mode, generates a pulse in synchronization with a simultaneous row number clock pulse generation circuit in the pixel reset scanning circuit 222 to be described later, regardless of the HD synchronous pulse that is input externally. In the synchronous curtain shutter mode, according to the setting of the reset scanning register to be described later, a plurality of rows can be reset simultaneously and the number of rows can be changed by a row address. FIG. 4 shows the situation with timing waveforms. Among row selection signals SELi output from the pixel reset scanning circuit, after SEL1 and SEL2 are reset by a row, SEL3 and SEL5 simultaneously become active, which indicates that the third row and the fifth row are simultaneously reset.

Here, the fourth row is not reset because of two-pixel one-cell in which the third column and the fourth column share the floating diffusion unit. Since an after-image generated by an insufficient pixel reset and a gap in the unit cell state between readout and pixel reset can be removed by avoiding resetting the shared pixels simultaneously, it is possible to reduce degradation in image quality. Therefore, in the next timing, SEL4 and SEL6 simultaneously become active, the fourth row and the sixth row are simultaneously reset, and the control is sequentially performed.

In other words, considering the operations for all rows in the imaging area by the row scanning unit 220, it is possible to perform pixel reset scan for all rows such that the pixels shared in the multiple-pixel one-cell structure are not simultaneously reset, and the scanning characteristics have a function of making it possible to arbitrarily select the number of rows to be reset in order to match the traveling characteristics of the rear curtain shutter.

Figure 3:
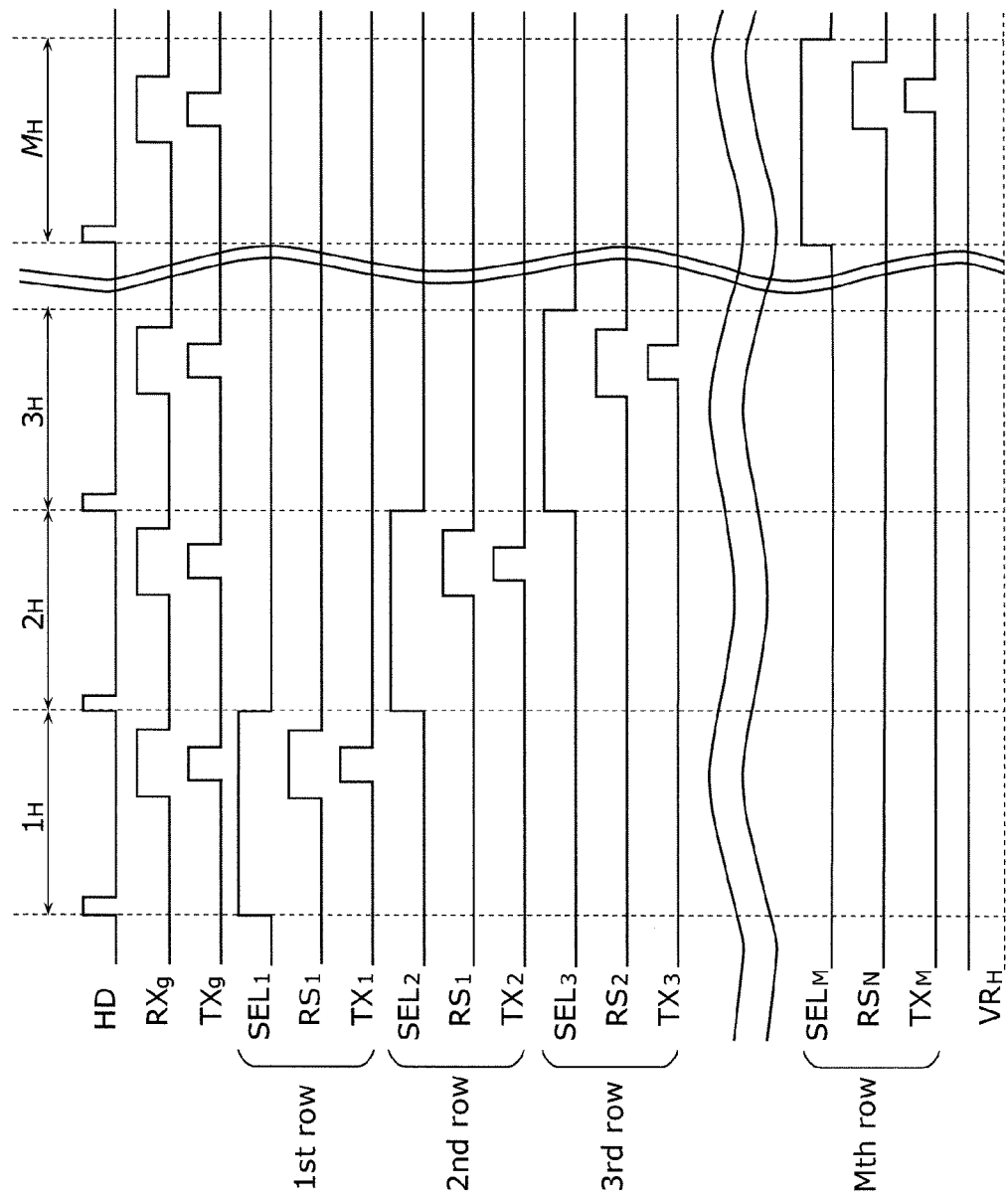
FIG. 3 is a diagram showing a pixel reset scan timing.

It should be noted that in FIGS. 3 and 4, $RS_i$, as similarly to $TX_i$, is indicated by a waveform which controls for each of the rows. RS can become active in a pixel reset period for all the rows and a control such as vertical scanning can be performed only on $TX_i$.

Moreover, VR each indicated in FIGS. 3 and 4 is a pixel power source. The pixel configuration shown in FIG. 2B is illustrated because it is necessary for the configuration to control voltage at a time of readout. But since a power source potential may be maintained during pixel reset scan, VR is not directly related to the present invention.

Next, with reference to FIG. 5, details of the reset scanning register 223 will be described.

Figure 5:
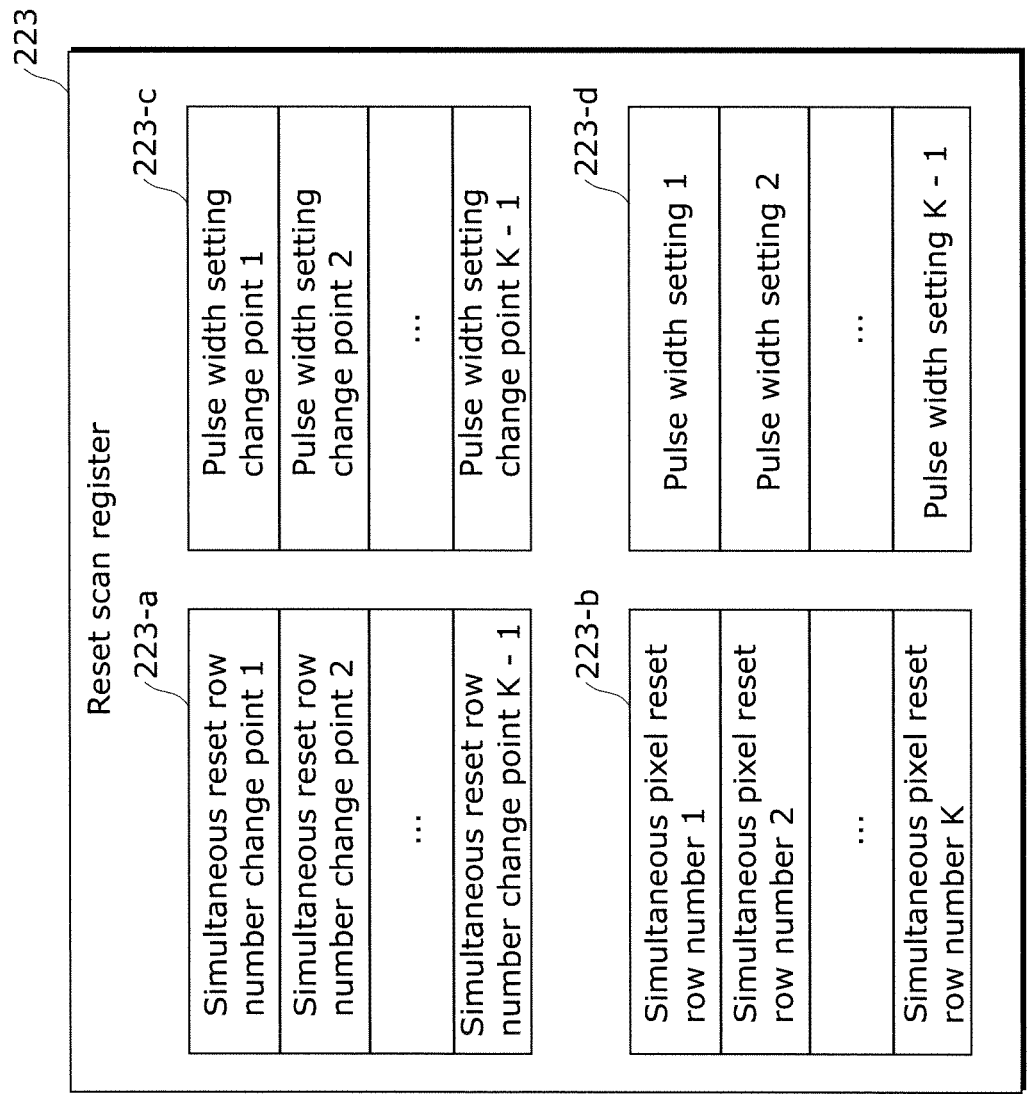
FIG. 5 is a diagram showing a reset scan register which sets a parameter according to a reset scan in the embodiment of the present invention.

As shown in FIG. 5, the reset scanning register 223 is a register file, including (K−1) registers from a simultaneous reset row number change point 1 to a simultaneous reset row number change point (K−1), K registers from a simultaneous pixel reset row number 1 to a simultaneous pixel reset row number K, (K−1) registers from a pulse width setting change point 1 to a pulse width setting change point (K−1), and K registers from a pulse width setting 1 to a pulse width setting K.

Moreover, the simultaneous reset row number change point i and the pulse width setting change point i are each a register which specifies a row corresponding to a break point when pixel reset scan is regarded as a line chart. The simultaneous pixel reset row number i and the pulse width setting K are each a register which specifies the number of rows to be simultaneously reset and, in response to the line chart, are each a parameter which corresponds to a slope for each of the broken lines.

Figure 6:
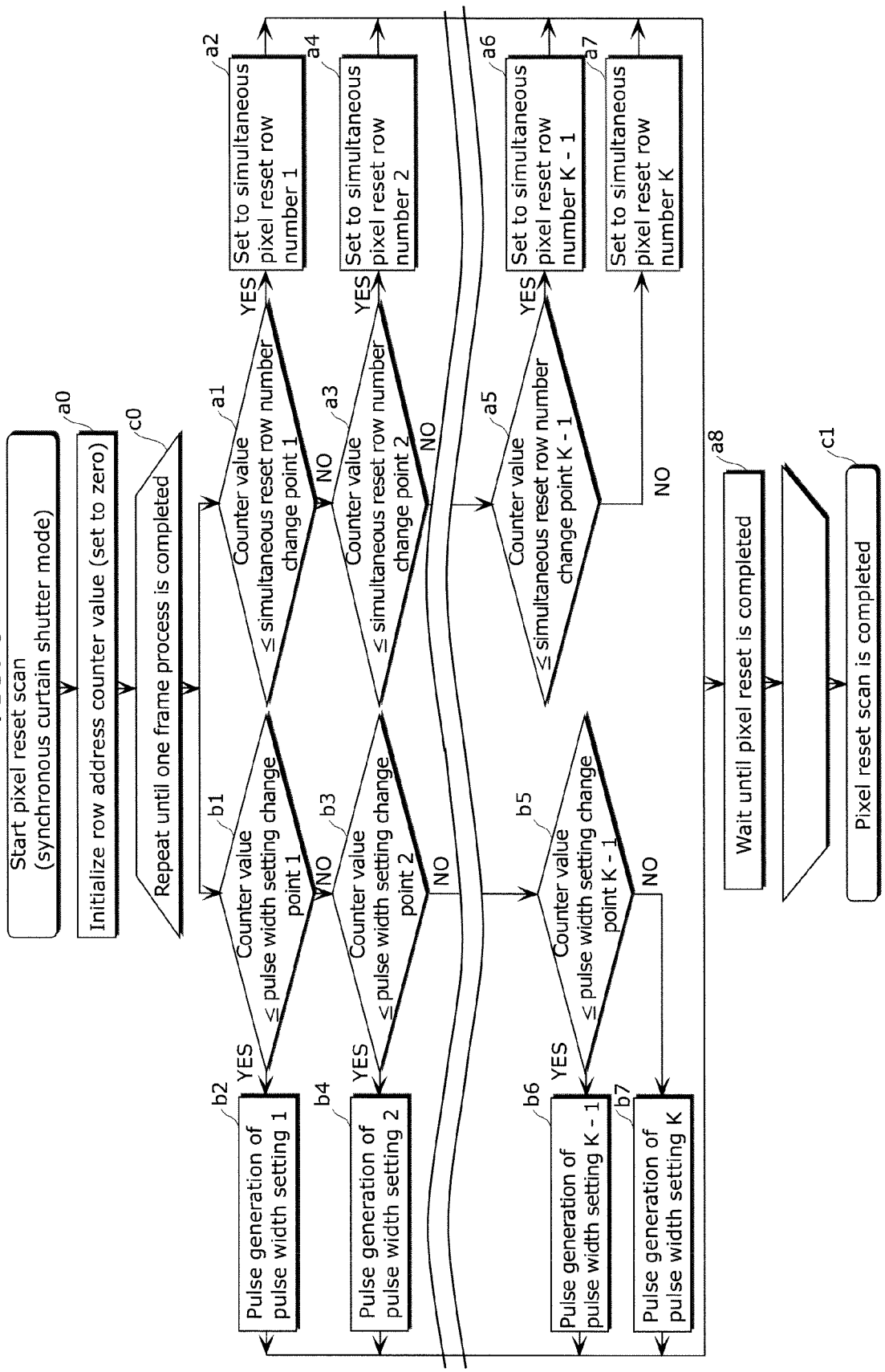
FIG. 6 is a diagram showing a control flow of a pixel reset scan in a piecewise linear approximation according to the embodiment of the present invention.

The following will describe specific operations of the row scanning unit 220 with reference to FIG. 6 which is a flowchart of a piecewise linear approximation.

From FIG. 6, first, when the vertical scanning is started, a counter value which denotes the pixel reset row is initialized (set to zero) (Step a0 in FIG. 6. The same shall apply hereafter). Next, when a condition judgment for (the counter value≤the simultaneous reset row number change point 1) (Step a1) is satisfied, it is set such that the counter value is counted by a row address counter for the number of rows set by the simultaneous pixel reset row number 1 (Step a2).

Moreover, in parallel with Step a1 and Step a2, the condition judgment for (the counter value≤the pulse width setting change point 1) (Step b1) is satisfied, it is set such that the pixel reset pulse width is set to the pulse width set by the pulse width setting 1 (Step b2).

Moreover, when the condition of a1 is not satisfied and the condition judgment for (the counter value≤the simultaneous reset row number change point 2) (Step a3) is satisfied, it is set such that the counter value is counted by a row address counter for the number of rows set by the simultaneous pixel reset row number 2 (Step a4).

Moreover, when the condition of b1 is not satisfied and the condition judgment (for the counter value≤the pulse width setting change point 2) (Step b3) is satisfied, it is set such that the pixel reset pulse width is set to the pulse width set by the pulse width setting 2 (Step b4).

Moreover, when the condition of (the counter value≤the simultaneous reset row number change point K−2) is not satisfied and the condition judgment for (the counter value≤the simultaneous reset row number change point K−1) (Step a5) is satisfied, it is set such that the counter value is counted by the row address counter for the number of rows set by the simultaneous pixel reset row number K−1 (Step a6).

Moreover, when the condition of (the counter value≤the pulse width setting change point K−2) is not satisfied and the condition judgment for (the counter value≤the pulse width setting change point K−1) (Step b5) is satisfied, it is set such that the pixel reset pulse width is set to the pulse width set by the pulse width setting K−1 (Step b6).

Moreover, when the counter value is greater than the simultaneous reset row number change point K−1, it is set such that the counter value is counted by the row address counter for the number of rows set by the simultaneous pixel reset row number K (Step a7).

Moreover, when the counter value is greater than the pulse width setting change point K−1, it is set such that the counter value is counted by the row address counter for the number of rows set by the pulse width setting K (Step a7).

Finally, after a wait until the pixel reset completion timing (Step a8), it is determined whether or not the pixel reset for all rows is completed. If not completed, the above described flow is repeatedly performed (Step c0 to Step c1). If the pixel reset for all rows is completed, the scan as the electronic front curtain shutter is completed.

Next, with reference to FIG. 7, a method for performing pixel reset scan while changing the number of rows simultaneously selected by the pixel reset scanning circuit 222 and the pixel reset pulse width according to information of the reset scanning transistor 223 will be described.

First, when the pixel reset scan is started, an odd number counter 67 and an even number counter 61 are initialized (set to zero) with rst_v signal provided from the camera system control unit 400. At this stage, a decoder is masked.

Next, an address range determination circuit 62 compares data of the even number counter 61 (count) with the values set in the simultaneous reset row number change point register and the pulse width setting change point register, and then outputs select_num which is any value of 1 to K (that is a result of determining an address range). Then, selectors 63 and 71 each output, as select_data, the values of the simultaneous pixel reset row number register and the pulse width setting register that correspond to select_num. It should be noted that the address range determination circuit 62 is controlled by a falling pulse of a simultaneous row number clock pulse generation circuit 64.

The simultaneous row number clock pulse generation circuit 64 outputs a pulse according to the input pulse width setting (select_data).

A 1-bit counter 69 counts and outputs with a pulse of the simultaneous row number clock pulse generation circuit 64.

The odd number counter 67 activates when the 1-bit counter 69 is "L", and counts and outputs odd values such as 1, 3, 5, . . . by count_clk which is generated at the pixel simultaneous reset row number (select_data) set by the selector 63.

The even number counter 61 activates when the 1-bit counter 69 is "H", and counts and outputs even values such as 2, 4, 6, . . . by count_clk which is generated at the pixel simultaneous reset row number (select_data) set by the selector 63.

A selector 68 outputs the data input from the odd number counter 67 to an address decoder 65 when the 1-bit counter 69 is "L", and outputs the data input from the even number counter 61 to the address decoder 65 when the 1-bit counter 69 is "H".

The address decoder 65 is reset by a signal of an address selection reset circuit 70 which is generated in synchronization with a falling pulse of the simultaneous row number clock pulse generation circuit 64. Moreover, every time when a count value is input from the selector 68, the address decoder 65 decodes the input count value as a row address, and sets any of corresponding line_sel1 to line_selM to be active ("H" level). With this, "H" is written into a corresponding latch in a reset row selection circuit 66. The latch is called a reset selection latch.

Hi level is fixedly connected to a data input terminal of the reset selection latch, while any of line_sel1 to line_selM that is an output of the address decoder 65 is connected to the clock input terminal. When the signals become active, "H" level is written.

All row addresses for the number of rows to be simultaneously reset in a pixel reset operation are sequentially decoded, and 1 is written to all reset selection latches of the corresponding row of the reset row selection circuit 66. SEL1 to SELM which take logical AND between the latch value and the simultaneous row number clock pulse generation circuit are output from the reset row selection circuit 66.

Next, by taking logical AND with TXg and RSg generated from the horizontal synchronizing signal generation circuit 221 (refer to FIG. 2A), pixel reset for all selection rows that are stored in the reset selection latch 1 is performed.

Finally, a pixel reset operation is completed by a reset of the reset selection latch and the address decoder with rst_h signal which is generated by the address selection reset circuit in synchronization with a falling pulse of the simultaneous row number clock pulse generation circuit 64. Next, as shown in the control flow of FIG. 6, until a single frame process is ended, the above described address range determination circuit 62 receives a signal of a falling pulse of the simultaneous row number clock pulse generation circuit 64 and sequentially repeats a process from the address comparison.

By following the above described steps, the pixel reset scanning circuit 222 can change the number of rows to be selected simultaneously, and further perform a reset scanning by changing the pulse width.

Figure 7:
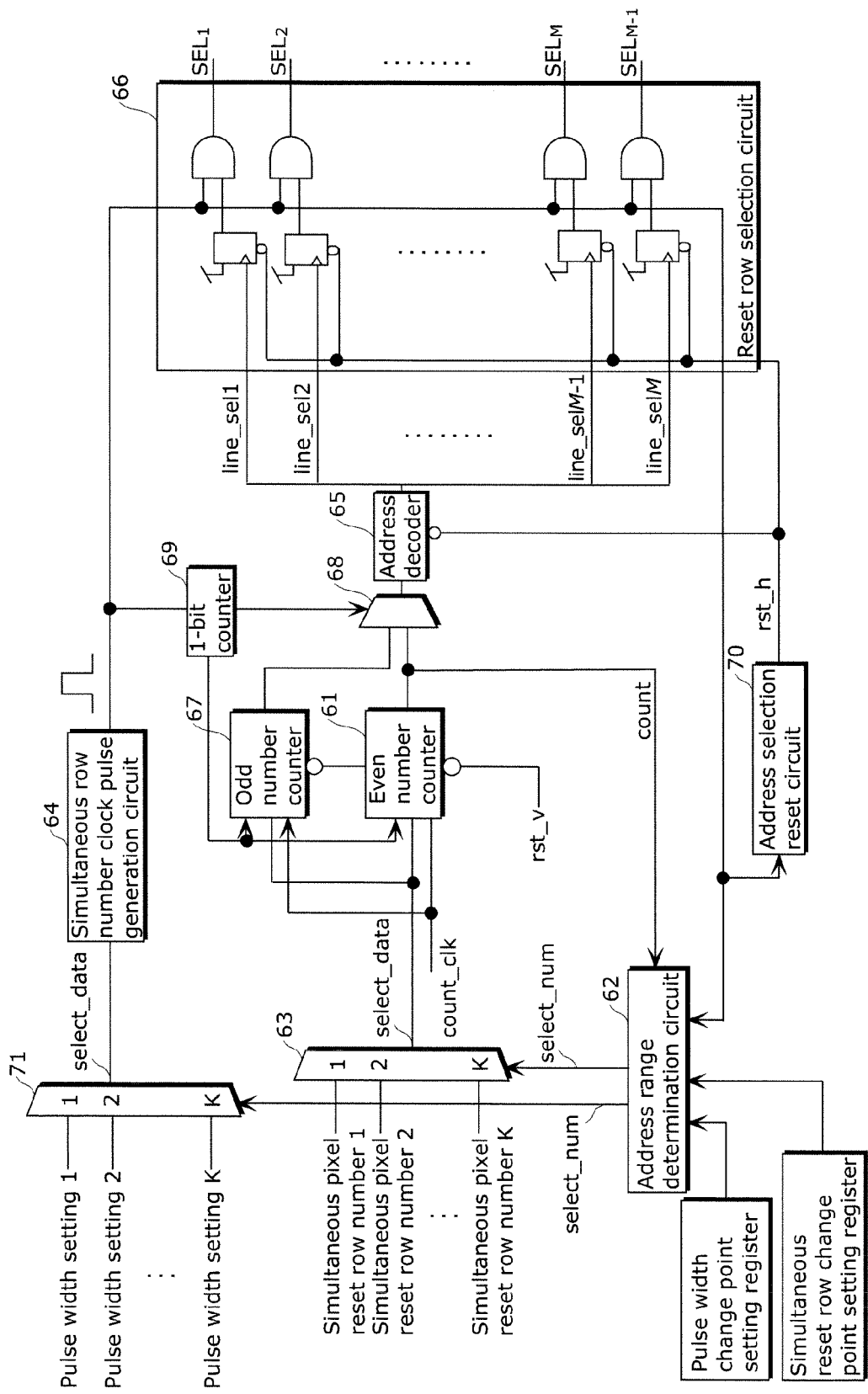
FIG. 7 is a diagram showing an example of a configuration of a pixel reset scan circuit according to a reset scan in the embodiment of the present invention.
Figure 8:
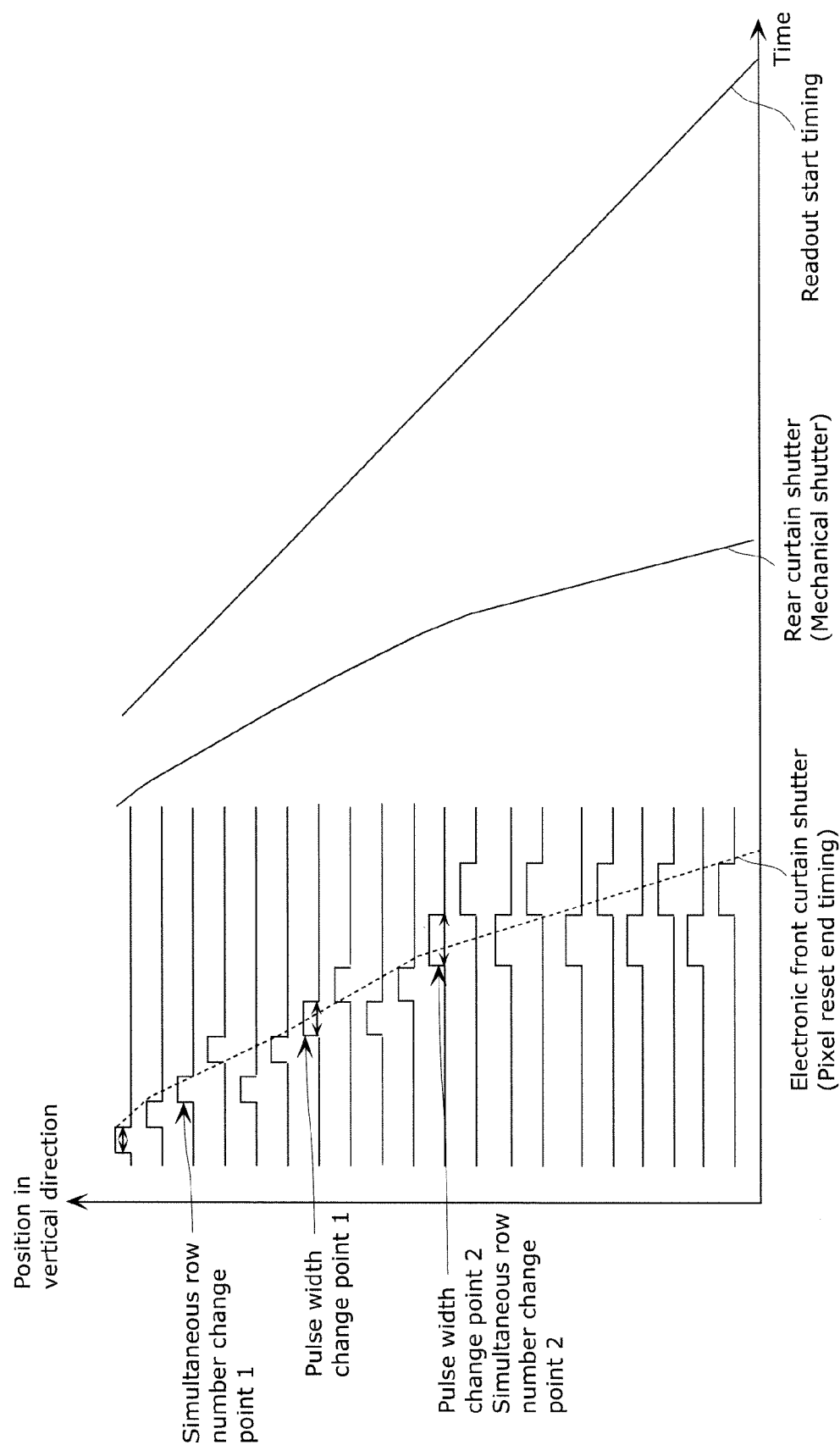
FIG. 8A is a diagram showing a reset scan timing according to the embodiment of the present invention.
FIG. 8B is a diagram showing a setting example of a reset scan register according to the embodiment of the present invention.

The following will describe that it is possible to perform, by the flowchart in FIG. 6 and the operation in FIG. 7, scan suited to the traveling characteristics of the rear curtain shutter in the synchronous curtain shutter mode, with reference to FIGS. 8A and 8B.

FIG. 8A shows that a vertical axis corresponds to a position in a vertical direction, a horizontal axis corresponds to time, and a pulse for each of the rows indicates a pixel reset timing. Moreover, FIG. 8A also shows the rear curtain shutter (mechanical shutter) and readout start timing such that the relation with the rear curtain shutter can be imagined.

For example, as shown in FIG. 8B, the set values of the simultaneous row number change points 1, 2, and 3 are set to 2, 10, and 20, respectively, the set values of the simultaneous pixel reset row numbers 1, 2, and 3 are set to 1, 2, and 5, respectively, the set values of the puke width setting change points 1, 2, and 3 are set to 6, 10, and 20, respectively, and the set values of the pulse width settings 1, 2, and 3 are set to 10, 15, and 20 (the pulse width setting is, for example, the number of clock cycles in the pulse generation circuit). In this case, since the counter value satisfies the conditions of Steps a1 and b1 from the first row to the second row, a reset is single-handedly performed on each of the rows according to the simultaneous pixel reset row number 1 (=1) and the pulse width setting 1 (=10).

Since the counter value satisfies the conditions of Steps a3 and b1 from the third row to the sixth row, a reset is simultaneously performed on two rows at a pulse width of 10 cycles according to the simultaneous pixel reset row number 2 (=2) and the pulse width setting 1 (=10) (Steps a4 and b2).

Since the counter value satisfies the conditions of Steps a3 and b3 from the seventh row to the 10th row, a reset is simultaneously performed on two rows at a pulse width of 15 cycles according to the simultaneous pixel reset row number 2 (=2) and the pulse width setting 2 (=15) (Steps a4 and b4).

Since the counter value satisfies the conditions of Steps a5 and b5 from the 11th row to the 20th row, a reset is simultaneously performed on five rows at a pulse width of 20 cycles according to the simultaneous pixel reset row number 3 (=5) and the pulse width setting 3 (=20) (Steps a6 and b6).

In this way, by performing a pixel reset while changing the simultaneous row number and the pulse width sequentially according to the register setting, the timing of the electronic front curtain shutter by the pixel reset can be approximate to the non-linear traveling characteristics of the rear curtain shutter.

As described the above, the solid-state imaging device according to the embodiment of the present invention has the following features.

(a) The row scanning unit, in the mechanical curtain synchronous shutter mode, does not simultaneously turn on a plurality of the transfer transistors in the unit cell on while simultaneously turns on the transfer transistors of unit cells of different rows.

With this configuration, it is possible to sufficiently reset each of the photodiodes in a corresponding one of the unit cells, to prevent an after-image caused by the existence of electric charges that are not reset, and to reduce degradation in image quality.

(b) The solid-state imaging device further includes a first register group (223-*b* and 223-*a*) which holds the number of rows that the pixel reset should be simultaneously performed and row addresses in which the number of rows is changed. The row scanning unit, in the mechanical curtain synchronous shutter mode, performs the pixel reset scan according to the number of rows and the row address written into the first register group.

With this configuration, in the case where the traveling characteristics of the mechanical curtain shutter are non-linear and kinds of the mechanical curtain shutters are different, it is possible to finely match the number of synchronous rows and the changed row in the pixel reset scan.

(c) The solid-state imaging device further includes a second register group (223-*d* and 223-*c*) which holds the pulse width on which pixel reset is performed and the row address in which the pulse width is changed. The row scanning unit, in the mechanical curtain synchronous shutter mode, performs the pixel reset scan according to the pulse width and the row address written into the second register group.

With this configuration, in the case where the traveling characteristics of the mechanical curtain shutter are non-linear and kinds of the mechanical curtain shutters are different, it is possible to finely match the pulse width and the changed rows in the pixel reset scan. Moreover, it is possible to avoid causing a gap in reset state between the photodiodes in the unit cell, and decrease degradation in image quality.

(d) The row scanning unit performs, in the mechanical curtain synchronous shutter mode, a pixel reset scan such that in the pixel reset operation on unit cells of different rows simultaneously, rising timing and falling timing of the reset pulse signal to the unit cells of different rows match and rising timing and falling timing of the transfer pulse signal to unit cells of different rows match.

With this configuration, coupling noise caused by the overlap of the reset period of the Nth row (when the reset signal is asserted) and the rising and falling of the reset signals of a plurality of rows that are neighboring back and forth can be prevented. In other words, variation in the reset level by coupling can be prevented and degradation in image quality can be reduced.

As described above, the imaging device according to the present embodiment makes it possible to fit the traveling characteristics of the start of exposure to the traveling characteristics of the rear curtain shutter by holding a change point in which the number of simultaneous resets and the pulse width setting for a plurality of rows are changed even though the imaging device has a unit cell structure in the synchronous curtain shutter mode in which a plurality of pixels are shared by a reset transistor and a floating diffusion unit. Moreover, since a simultaneous reset is not performed on a pixel shared in a multiple-pixel one-cell structure at the time of simultaneous reset for a plurality of rows, image capture with the use of the electronic front curtain shutter is possible without degradation in image quality.

It should be noted that the present invention can be applied without depending on a detailed configuration of a pixel.

Figure 10:
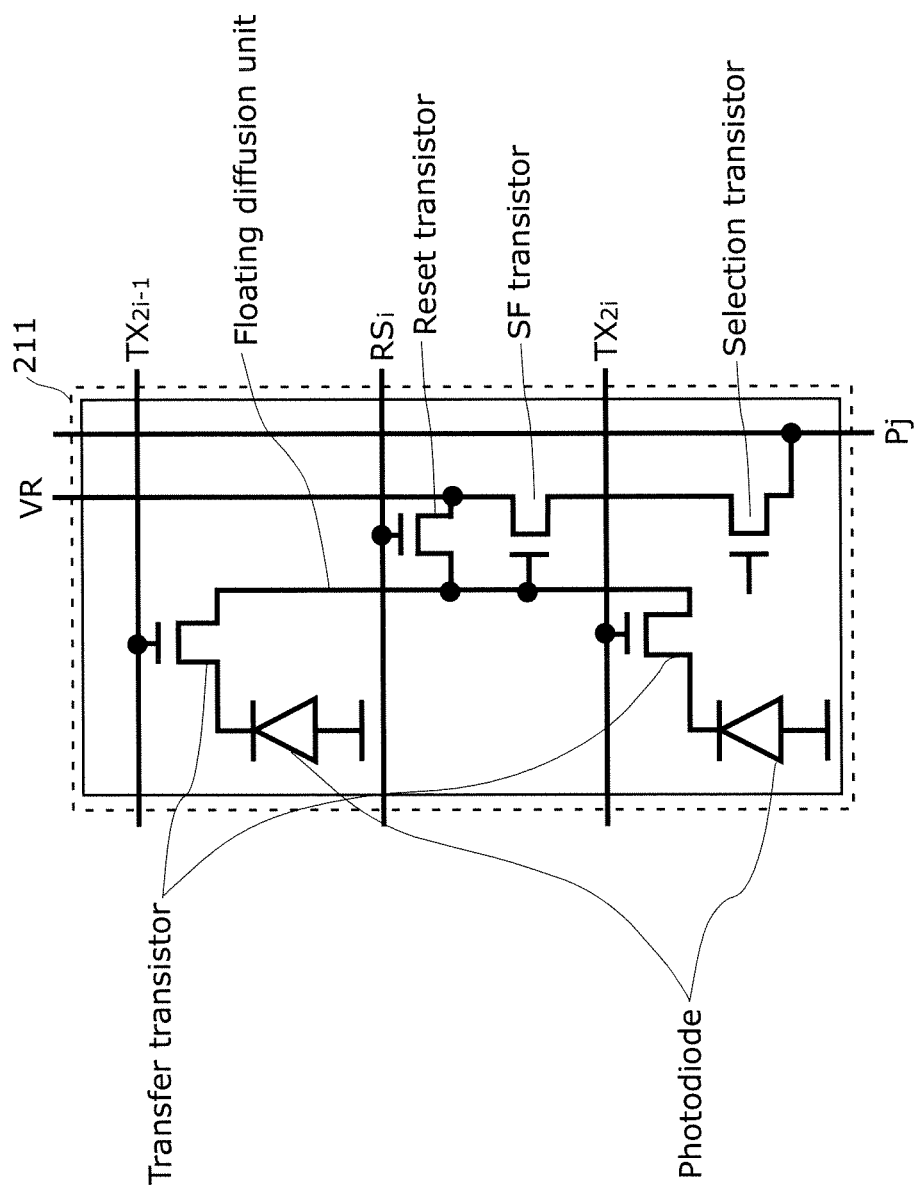
FIG. 10 is a diagram showing another example of a configuration of a unit cell according to the embodiment of the present invention.
Figure 11:
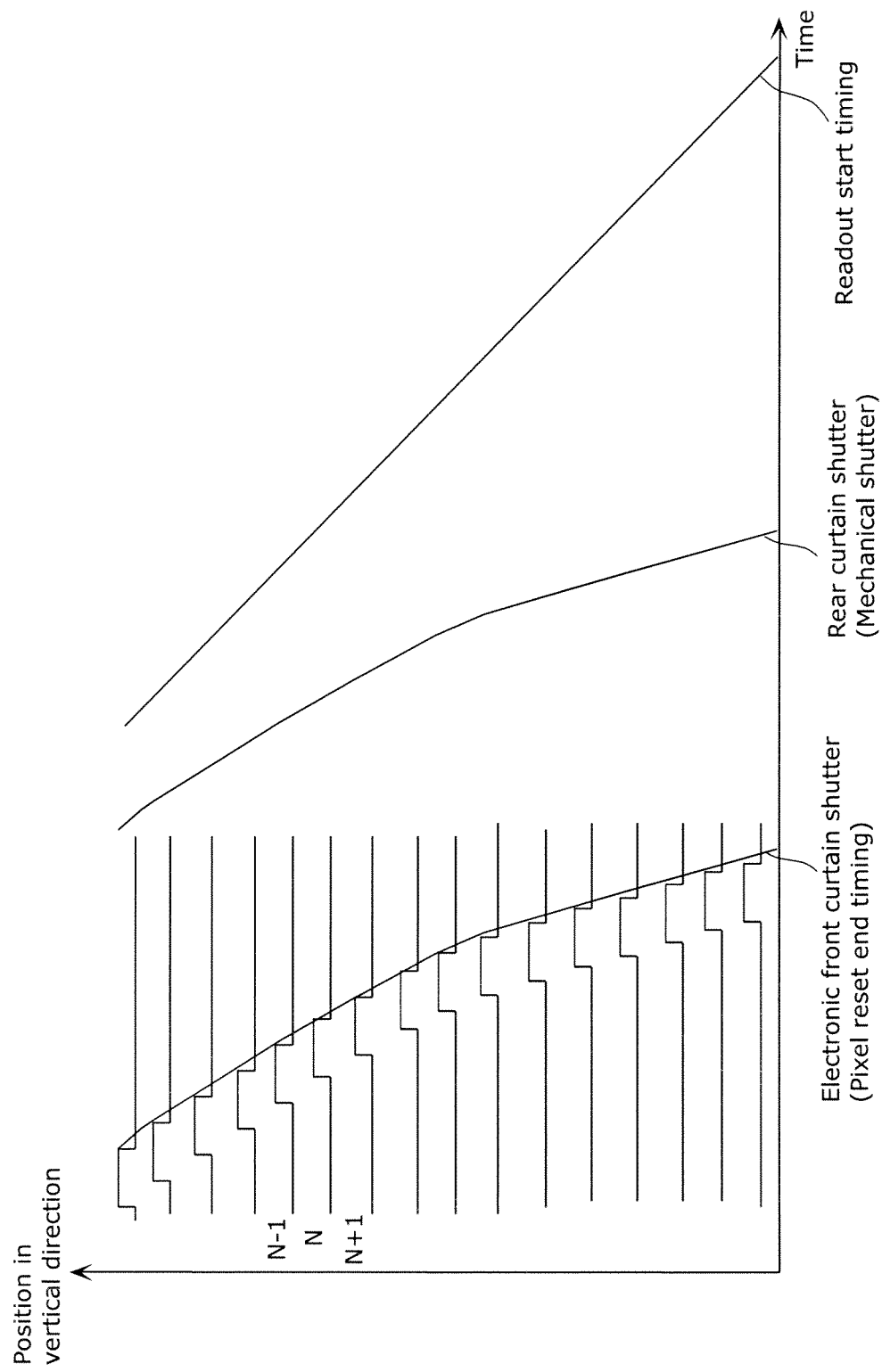
FIG. 11 is a diagram showing the conventional reset scan timing.

For example, the present invention, as shown in FIG. 10, can adopt a configuration in which s selection transistor is included in a unit cell.

Moreover, the present invention can be applied without depending on the absence or existence of A/D conversion and a circuit method of a signal output path from a pixel.

In the present invention, the reset scanning register 223 is included in the row scanning unit 220. In the solid-state imaging device 200 according to the present embodiment, however, the reset scanning register may be included in another block. Moreover, for example, in the case where the image signal processing unit 300 and the camera system control unit 400 are mounted on the same silicon substrate as that of the solid-state imaging device 200 according to the present embodiment, the reset scanning register 223 can be included in the image signal processing unit 300 and the camera system control unit 400.

Moreover, the present embodiment describes the case where, as a reset scanning parameter, the simultaneous row number and the row address in which the number is changed are specified. For example, there is no change in effect of the present invention after an increment of the number of simultaneous reset rows is determined as a parameter.

It should be noted that the solid-state imaging device is not defined only by the above described embodiment. Other embodiments implemented by combination of any constituent elements according to the embodiment, modifications to the embodiment obtained from those skilled in the art without materially departing from the novel teachings and advantages of this invention, and various devices including the solid-state imaging device according to the present invention are included in the present invention.

INDUSTRIAL APPLICABILITY

The present invention is capable of fitting the scan timing of the electronic front curtain shutter to the traveling characteristics of the curtain shutter without side-effects such as degradation in image quality including an after-image and a horizontal line, as the imaging device and the solid-state imaging device. For example, the present invention can be applied to a digital single-lens reflex camera, a digital single-lens still camera, and a digital still camera.

The invention claimed is:

1. A solid-state imaging device comprising:
   an imaging area in which a plurality of unit cells are arranged in rows and columns; and
   a row scanning unit configured to perform pixel reset scan and pixel readout scan in the imaging area on a row-by-row basis,
   wherein each of the unit cells includes:
   two or more photodiodes each of which converts incident light into electric charges;
   a floating diffusion unit configured to hold the electric charges;
   a transfer transistor which is provided in correspondence with the two or more photodiodes and transfers the electric charges from the photodiodes to the floating diffusion unit; and
   a reset transistor which resets electric potential of the floating diffusion unit,
   wherein, in each of the unit cells, the two or more photodiodes share the reset transistor and the floating diffusion unit,
   the row scanning unit is configured to activate a mechanical curtain synchronous shutter mode in which pixel reset scan is performed and exposure of the imaging area is started by the pixel reset scan and is ended by light shielding by a mechanical curtain shutter, the pixel reset scan meaning that scan on a row-by-row basis is performed on pixel reset in which the photodiodes are reset by turning on the transfer transistor and a corresponding reset transistor, in the mechanical curtain synchronous shutter mode, the pixel reset scan is performed according to traveling characteristics of the mechanical curtain shutter, and the pixel reset scan includes performing a pixel reset operation simultaneously on the unit cells of different rows.

2. The solid-state imaging device according to claim 1, wherein in the mechanical curtain synchronous shutter mode, the row scanning unit is configured to: avoid simultaneously turning on the transfer transistor and an other transfer transistor included in the unit cell; and simultaneously turn on transfer transistors in unit cells of different rows.

3. The solid-state imaging device according to claim 2, further comprising a first register group which holds a number of rows in which the pixel reset is to be simultaneously performed and a row address in which the number of rows is changed, wherein in the mechanical curtain synchronous shutter mode, the row scanning unit is configured to perform the pixel reset scan according to the number of rows and the row address that are written into the first register group.

4. The solid-state imaging device according to claim 3, further comprising a second register group which holds a pulse width with which the pixel reset is performed and a row address in which the pulse width is changed, wherein in the mechanical curtain synchronous shutter mode, the row scanning unit is configured to perform the pixel reset scan according to the pulse width and the row address that are written into the second register group.

5. The solid-state imaging device according to claim 1, wherein in the mechanical curtain synchronous shutter mode, the row scanning unit is configured to perform the pixel reset scan such that in a simultaneous pixel reset operation on unit cells of different rows, rising timing and falling timing of a reset pulse signal to the unit cells of the different rows match and rising timing and falling timing of a transfer pulse signal to the unit cells of the different rows match.

6. An imaging device comprising:
a mechanical curtain shutter; and
the solid-state imaging device according to claim 1.

* * * * *